United States Patent [19]

Herzke

[11] Patent Number: 4,953,690

[45] Date of Patent: Sep. 4, 1990

[54] CONVEYOR WITH SLIPPAGE STOPS ON THE CONVEYOR SURFACE

[75] Inventor: Harry Herzke, Allensteiner, Fed. Rep. of Germany

[73] Assignee: Firma Ernst Siegling, Hanover, Fed. Rep. of Germany

[21] Appl. No.: 409,091

[22] Filed: Sep. 19, 1989

[30] Foreign Application Priority Data

Sep. 29, 1988 [JP] Japan .................................. 3833034

[51] Int. Cl.⁵ .............................................. B65G 15/44
[52] U.S. Cl. ................................... 198/690.2; 198/697
[58] Field of Search .......... 198/688.1, 690.2, 697–699, 198/699.1, 715, 803.14

[56] References Cited

U.S. PATENT DOCUMENTS 3,939,965  2/1976  Blattermann et al. ............ 198/688.1

FOREIGN PATENT DOCUMENTS 670461 11/1929 France ............................... 198/699.1
590199  1/1978 U.S.S.R. .............................. 199/698

Primary Examiner—Joseph E. Valenza
Attorney, Agent, or Firm—Penrose Lucas Albright

[57] ABSTRACT

A conveyor comprising an endless elastic conveyor belt extending around guide rollers to define a conveying portion and a returning portion, and support means for supporting the returning portion of the belt, is provided with longitudinally spaced stops on the belt to prevent or halt slippage of material carried by the conveying portion, each stop being disposed on a tongue formed in the belt by a pair of parallel slits in the belt so that the tongue has two longitudinal free edges and a transverse transition edge at each end at which the tongue merges flush into the belt.

3 Claims, 1 Drawing Sheet

CONVEYOR WITH SLIPPAGE STOPS ON THE CONVEYOR SURFACE

BACKGROUND OF THE INVENTION

1. Field of the invention

The invention relates to a conveyor comprising an endless elastic conveyor belt having a conveyor surface, guide rollers around which the conveyor belt passes to define a conveying portion and a returning portion of the belt, support means, such as a series of spaced rollers, for supporting the returning portion, and a plurality of stops spaced longitudinally apart on the conveyor surface for engaging material carried by the conveying portion of the belt to prevent or halt slippage of the material on the belt.

2. Summary of the prior art

My U.S. patent application Ser. No. 336,330 filed Apr. 11, 1989 discloses a conveyor of the above type having a plurality of tongues formed in the conveyor belt at longitudinally spaced intervals in the direction of travel of the belt, each of the tongues being formed by slits in the belt and having two longitudinal side edges, a trailing transverse edge with respect to the direction of travel of the conveyor belt, and a leading edge transition portion disposed substantially parallel to the trailing transverse edge and merging flush into the belt, the stops being disposed on the tongues in the region of the trailing transverse edges thereof. Although this conveyor has demonstrated its ability to transport material in a particular direction, when that direction is reversed the stops on the returning portion of the belt run up against the support rollers, squashing the tongues and causing the conveyor surface to tear.

The German journal "Gummi und Asbest" (at 1956, page 75) shows a conveyor comprising an endless conveyor belt passing around guide rollers and provided with a plurality of dogs spaced at intervals on the conveyor surface having wedge-shaped run-on and run-off surfaces which cause the returning portion of the belt to adopt a wave-like motion when guided over its support rollers. The dogs, in this arrangement, consist of a rectangular bar having run-on and run-off surfaces at opposite ends which, according to a particular embodiment, are of semi-circular or angular design, both surfaces gradually merging with the conveyor surface. The wave-like motion of the returning portion of the belt caused by the continual running-up of the dogs against the support rollers has been found, however, to communicate itself to the rest of the conveyor belt, having a detrimental effect on the material carried by the belt and leading to possible damage of sensitive materials.

SUMMARY OF THE INVENTION

It is an object of the invention to provide a conveyor which is capable of transporting material in both a forward and a reverse direction without causing the stops to undergo excessive stresses and without causing the conveyor belt to oscillate.

To this end, according to the present invention there is provided a conveyor comprising an endless elastic conveyor belt, said belt having a conveyor surface, guide rollers around which said conveyor belt passes to define a conveying portion and a returning portion of said belt, support means for supporting said returning portion of said conveyor belt, a plurality of parallel slits formed in said conveyor belt at longitudinally spaced intervals in the direction of travel of said belt, said slits defining a plurality of longitudinally spaced tongues in said conveyor belt, each of said tongues having two longitudinal free edges, and two transverse transition edges at opposite ends of said tongue whereat the tongue merges flush into said belt, and a plurality of stops spaced longitudinally apart on said conveyor surface for engaging material carried by said conveying portion of said conveyor belt to prevent or halt slippage of said material on said conveying portion, said stops being disposed on said tongues.

With this arrangement the tongues on which the stops are disposed are capable of flexing relative to the conveyor surface so that when a stop on the returning portion of the belt runs up against the support means the stop flexes away from the support, thus avoiding excessive stress being imposed on the stop and the tongue. When the stop has moved past the support means the stop and tongue may return to their unflexed positions with the tongue once more co-planar with the conveyor belt.

Preferably the stops are disposed substantially midway between the two transverse transition edges.

In a particularly preferred form of the invention a gap is provided between the two longitudinal edges of each tongue and the adjacent edges of the conveyor belt bordering it.

An embodiment of the conveyor in accordance with the invention will now be described, by way of example, with reference to the accompanying diagrammatic drawings.

DESCRIPTION OF THE PREFERRED EMBODIMENT

Figure 1:
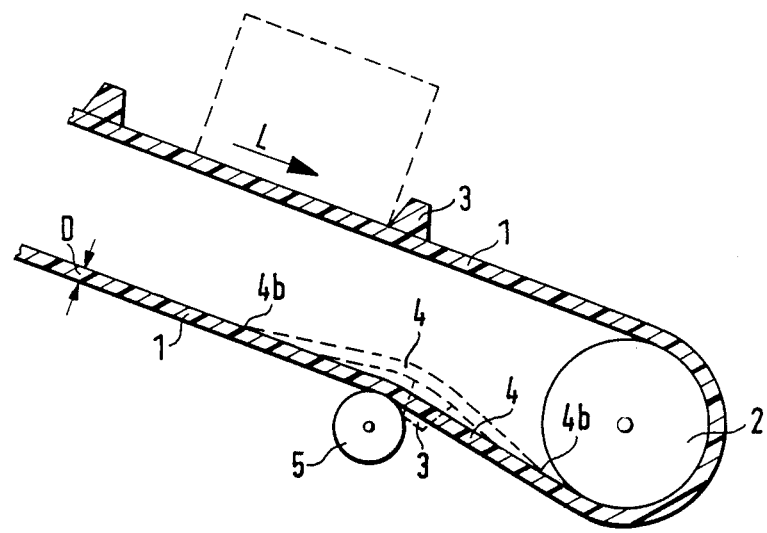
FIG. 1 shows a side view of an end portion of the conveyor in accordance with the invention.
Figure 2:
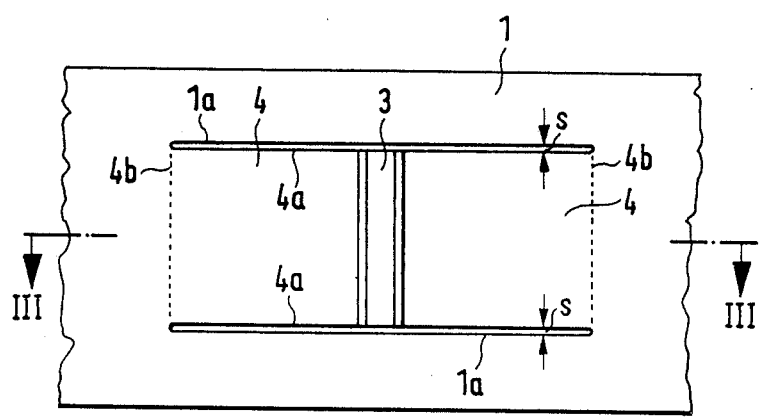
FIG. 2 shows on an enlarged scale a partial top plan view of the conveyor of FIG. 1.
Figure 3:
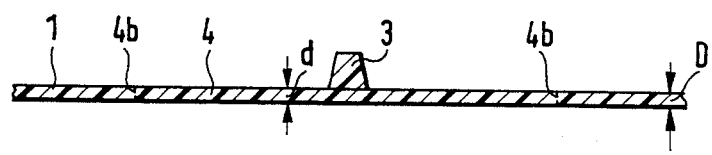
FIG. 3 is a longitudinal section along line III—III in FIG. 2.

The conveyor illustrated in FIGS. 1 to 3 comprises an endless elastic conveyor belt 1 which passes around guide rollers 2 so that the conveying surface of the belt faces outwardly. For reasons of clarity, only one guide roller 2 has been represented, and this is appropriately drivable, the direction of movement of the conveyor belt 1 being denoted by arrow L. As FIG. 1 shows, the conveying surface of the belt is inclined at an acute angle to the horizontal.

Reference numeral 3 denotes stops which are spaced from each other in the longitudinal direction of the conveyor belt 1. These stops 3, in the embodiment shown, have a trapezoidal shape in cross-section, but may be of any other shape as desired. It lies within the scope of the invention also to provide several spaced stops 3 in the transverse direction of the conveyor belt 1. In this respect the concept of the invention is not restricted in any way.

Each stop 3 is mounted on a tongue 4 having two longitudinal edges 4a and two transverse transition edges 4b. As FIGS. 2 and 3 clearly show, the tongue 4 is co-planar with the conveyor belt 1 and merges flush into the belt at the transverse transition edges 4b so that there are no points of impact of any kind on the tongue.

A gap s is provided between the edges 4a of the tongue 4 and the adjacent edges 1a of the conveyor belt 1 bordering the tongue so that a frictionless flexing of the tongue 4 is possible.

Preferably, the stop 3 is disposed substantially midway between the two transverse transition edges 4b.

The thickness d of the tongue 4, is the same as the thickness D of the conveyor belt 1, as shown in FIG. 3.

As will be seen in FIG. 1 the returning portion of the conveyor belt rests on a guide in the form of a succession of spaced support rollers in the direction of movement, although for reasons of clarity only one support roller 5 has been shown.

The conveyor shown in FIGS. 1 to 3 operates as follows:

Let it be assumed, for example, that individual cuboid items of material are being carried by the conveyor. If one of the items starts to slip on the conveyor surface because of insufficient friction, this slipping movement is halted when the item comes into engagement with a stop 3.

In the return run of the conveyor belt the stop 3 strikes the support roller 5 and, upon further movement of the returning portion of the belt 1, flexes together with the tongue on which the stop is disposed into the space between the conveying and returning portions of the belt as shown in FIG. 1 by means of a broken line. The striking side of the stop 3 is appropriately designed such that the impulse resulting from the impact with the rollers is reduced to a minimum.

Further movement of the returning portion of the conveyor belt 1 carries the stop past the roller 5, whereupon the stop is released so that, as a result of the elasticity of the tongue 4, the stop and the tongue may move to assume their unflexed positions with the tongue once more co-planar with the conveyor belt.

I claim:
1. A conveyor comprising:
    an endless elastic conveyor belt, said belt having a conveyor surface,
    guide rollers around which said conveyor belt passes to define a conveying portion and a returning portion of said belt,
    support means for supporting said returning portion of said conveyor belt,
    a plurality of parallel slits formed in said conveyor belt at longitudinally spaced intervals in the direction of travel of said belt, said slits defining a plurality of longitudinally spaced tongues in said conveyor belt, each of said tongues having
    two longitudinal free edges, and
    two transverse transition edges at opposite ends of said tongue whereat the tongue merges flush into said belt, and
    a plurality of stops spaced longitudinally apart on said conveyor surface for engaging material carried by said conveying portion of said conveyor belt to prevent or halt slippage of said material on said conveying portion, said stops being disposed on said tongues.
2. A conveyor according to claim 1, wherein said stops are disposed substantially mid-way between the said two transverse transition edges.
3. A conveyor according to claim 1, wherein said two longitudinal free edges of each of said tongues are spaced from the adjacent portions of said conveyor belt to provide a gap therebetween.

* * * * *